(12) United States Patent
Spangler

(10) Patent No.: US 11,982,231 B2
(45) Date of Patent: May 14, 2024

(54) HOURGLASS AIRFOIL COOLING CONFIGURATION

(71) Applicant: RAYTHEON TECHNOLOGIES CORPORATION, Farmington, CT (US)

(72) Inventor: Brandon W. Spangler, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/179,479

(22) Filed: Mar. 7, 2023

(65) Prior Publication Data

US 2023/0203991 A1    Jun. 29, 2023

Related U.S. Application Data

(62) Division of application No. 17/392,573, filed on Aug. 3, 2021, now Pat. No. 11,624,322, which is a division of application No. 16/515,528, filed on Jul. 18, 2019, now Pat. No. 11,111,857.

(51) Int. Cl.
| | |
|---|---|
| *B22C 9/10* | (2006.01) |
| *B22C 9/00* | (2006.01) |
| *B22C 9/22* | (2006.01) |
| *B22C 9/24* | (2006.01) |
| *B22C 13/12* | (2006.01) |
| *F01D 5/18* | (2006.01) |

(Continued)

(52) U.S. Cl.
CPC .................. *F02C 7/18* (2013.01); *B22C 9/00* (2013.01); *B22C 9/10* (2013.01); *B22C 9/103* (2013.01); *B22C 9/106* (2013.01); *B22C 9/22* (2013.01); *B22C 9/24* (2013.01); *B22C 13/12* (2013.01); *F01D 5/187* (2013.01); *F01D 25/12* (2013.01); *F05D 2220/32* (2013.01); *F05D 2260/204* (2013.01)

(58) Field of Classification Search
CPC .. B22C 9/10; B22C 9/103; B22C 9/22; B22C 9/24

See application file for complete search history.

(56) References Cited

U.S. PATENT DOCUMENTS

| | | | |
|---|---|---|---|
| 5,246,340 | A | 9/1993 | Winstanley et al. |
| 6,206,638 | B1 | 3/2001 | Glynn et al. |
| 7,217,092 | B2 | 5/2007 | Lee et al. |

(Continued)

FOREIGN PATENT DOCUMENTS

| | | |
|---|---|---|
| EP | 1793085 | 6/2007 |
| EP | 2258925 | 12/2010 |

(Continued)

OTHER PUBLICATIONS

Extended European Search Report for Application No. EP 20186780.1 dated Oct. 9, 2020.

*Primary Examiner* — Kevin E Yoon
(74) *Attorney, Agent, or Firm* — Carlson, Gaskey & Olds, P.C.

(57) ABSTRACT

A core structure for a providing a cooling passage in a gas turbine engine includes a core body that has a first cooling passage core. The first cooling passage core has a first width in a chord-wise direction near a first wall. A second width in the chord-wise direction near a second wall. A third width in the chord-wise direction between the first and second walls. The third width being smaller than the first and second widths to form an hourglass shape.

18 Claims, 5 Drawing Sheets

(51) Int. Cl.
    *F01D 25/12*     (2006.01)
    *F02C 7/18*     (2006.01)

(56) References Cited

U.S. PATENT DOCUMENTS

| | | |
|---|---|---|
| 7,293,961 B2 | 11/2007 | Lee et al. |
| 7,624,787 B2 | 12/2009 | Lee et al. |
| 8,052,389 B2 | 11/2011 | Kopmels |
| 8,523,523 B2 | 9/2013 | Townes et al. |
| 9,017,027 B2 | 4/2015 | Campbell et al. |
| 9,057,284 B2 | 6/2015 | Coffin et al. |
| 9,995,149 B2 | 6/2018 | Foster et al. |
| 10,871,074 B2 | 12/2020 | Spangler et al. |
| 2006/0292005 A1 | 12/2006 | Pietraszkiewicz |
| 2013/0149169 A1 | 6/2013 | Campbell |
| 2015/0184522 A1 | 7/2015 | Smith |
| 2017/0101893 A1 | 4/2017 | Marsh |
| 2019/0101007 A1 | 4/2019 | Propheter-Hinckley et al. |
| 2019/0136699 A1 | 5/2019 | Spangler et al. |

FOREIGN PATENT DOCUMENTS

| | | |
|---|---|---|
| EP | 3467264 | 4/2019 |
| EP | 3480432 | 5/2019 |
| WO | 2016122483 | 4/2016 |

HOURGLASS AIRFOIL COOLING CONFIGURATION

CROSS-REFERENCE TO RELATED APPLICATION

This application is a divisional application of U.S. application Ser. No. 17/392,573, filed on Aug. 3, 2021, which is a divisional application of U.S. application Ser. No. 16/515,528, filed on Jul. 18, 2019.

BACKGROUND

This disclosure relates to gas turbine engines and particularly to internally cooled airfoils of rotor blades and stator vanes.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Internally cooling turbine blades may allow for use of higher gas temperatures, which may improve the engine's performance. Serpentine core cooling passages have been used to cool turbine blades. The serpentine cooling passage is arranged between the leading and trailing edge core cooling passages in a chord-wise direction. One typical serpentine configuration provides "up" passages arranged near the leading and trailing edges fluidly joined by a "down" passage.

SUMMARY OF THE INVENTION

In one exemplary embodiment, an airfoil includes pressure and suction side walls that extend in a chord-wise direction between leading and trailing edges. The pressure and suction side walls also extend in a radial direction to provide an exterior airfoil surface. A cooling passage is arranged between the pressure and suction walls. The cooling passage has a first width in the chord-wise direction near the suction side wall. A second width is in the chord-wise direction near the pressure side wall. A third width is between the pressure and suction side walls. The third width is smaller than the first and second widths.

In a further embodiment of any of the above, a second cooling passage is arranged adjacent the cooling passage. The second cooling passage has a kite shape.

In a further embodiment of any of the above, a plurality of apertures connect the second cooling passage with the cooling passage.

In a further embodiment of any of the above, the cooling passage has an hourglass shape.

In a further embodiment of any of the above, the third width is between about 0.002 and about 0.100 inches (0.0508-2.540 mm).

In a further embodiment of any of the above, the first width defines a suction side cavity. The second width defines a pressure side cavity. The third width defines a passage between the pressure and suction side cavities.

In a further embodiment of any of the above, the pressure and suction side cavities are defined by a first internal wall and a second internal wall. Each of the first and second internal walls have a bent portion.

In a further embodiment of any of the above, the cooling passage is one of a plurality of cooling passages. Some of the plurality of cooling passages are in communication with one another in a serpentine cooling configuration.

In a further embodiment of any of the above, the cooling passage is one of a plurality of cooling passages. Each of the plurality of cooling passages receive air from a source and direct the air flow radially.

In another exemplary embodiment, a gas turbine engine includes a combustor section arranged fluidly between compressor and turbine sections. An airfoil is arranged in the turbine section. The airfoil has pressure and suction side walls that extend in a chord-wise direction between leading and trailing edges. The pressure and suction side walls also extend in a radial direction to provide an exterior airfoil surface. A cooling passage is arranged between the pressure and suction walls. The cooling passage has a first width in the chord-wise direction near the suction side wall. A second width is in the chord-wise direction near the pressure side wall. A third width is between the pressure and suction side walls. The third width is smaller than the first and second widths.

In a further embodiment of any of the above, a second cooling passage is arranged adjacent the cooling passage. The second cooling passage has a kite shape.

In a further embodiment of any of the above, a plurality of apertures connect the second cooling passage with the cooling passage.

In a further embodiment of any of the above, the cooling passage has an hourglass shape.

In a further embodiment of any of the above, the third width is between about 0.002 and about 0.100 inches (0.0508-2.540 mm).

In a further embodiment of any of the above, the first width defines a suction side cavity. The second width defines a pressure side cavity. The third width defines a passage between the pressure and suction side cavities.

In a further embodiment of any of the above, the pressure and suction side cavities are defined by a first internal wall and a second internal wall. Each of the first and second internal walls have a bent portion.

In a further embodiment of any of the above, the cooling passage is one of a plurality of cooling passages. Some of the plurality of cooling passages are in communication with one another in a serpentine cooling configuration.

In a further embodiment of any of the above, the cooling passage is one of a plurality of cooling passages. Each of the plurality of cooling passages receives air from a source and directs the air flow radially.

In another exemplary embodiment, a core structure for a providing a cooling passage in a gas turbine engine component includes a core body that has a first width in a chord-wise direction near a first wall. A second width is in the chord-wise direction near a second wall. A third width is in the chord-wise direction between the first and second walls. The third width is smaller than the first and second widths to form an hourglass shape.

In a further embodiment of any of the above, the first, second, and third widths are formed from a die having rib and a pocket that receives the rib.

DETAILED DESCRIPTION

Figure 1:
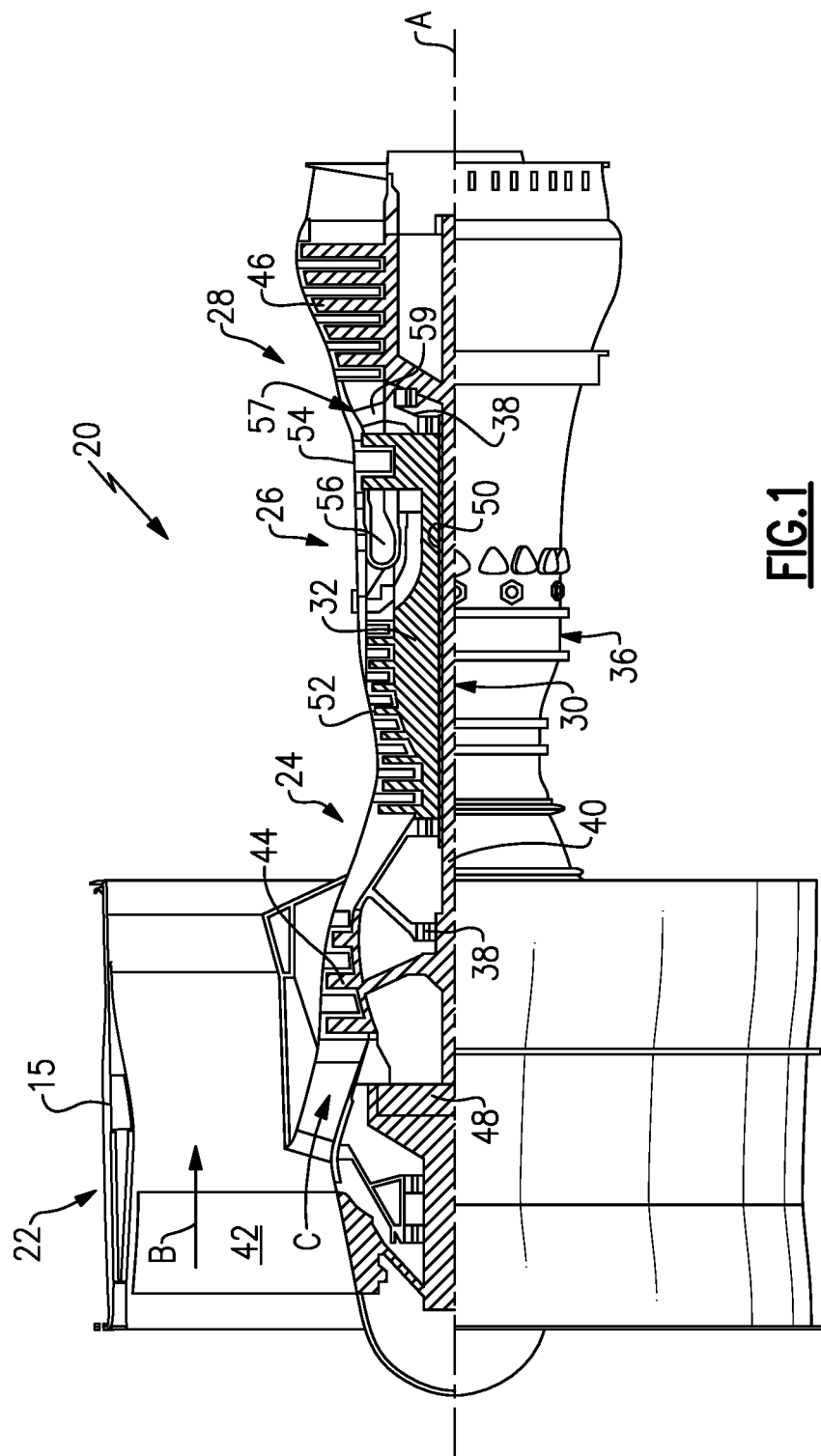
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
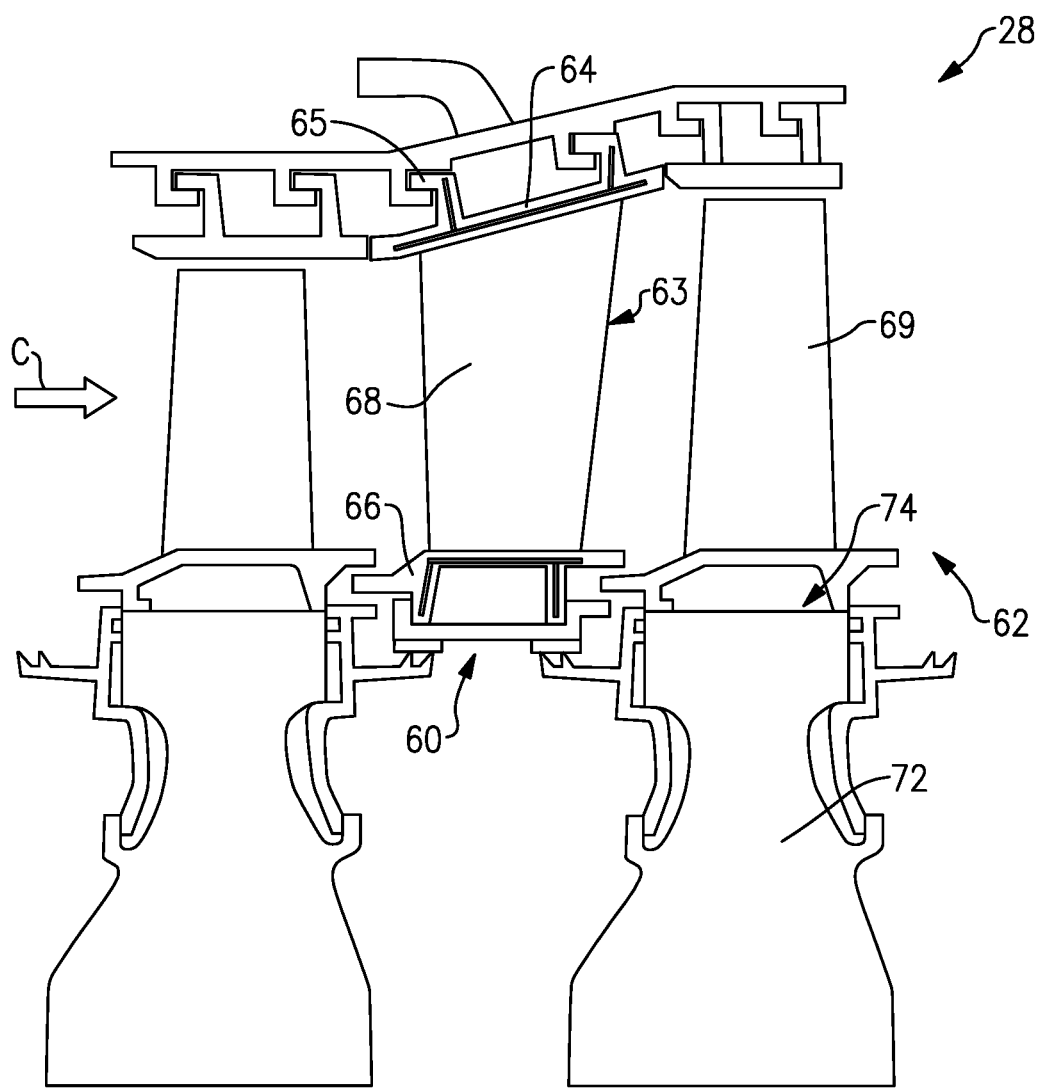
FIG. 2 schematically illustrates an example engine section including a fixed stage and a rotating stage.

FIG. 2 shows a portion of an example engine, for example, a turbine section 28. It should be understood, however, that this disclosure may also be provided in a compressor section. The section 28 includes a fixed stage 60 that provides a circumferential array of vanes 63 arranged axially adjacent to a rotating stage 62 with a circumferential array of blades 69. In the example, the vanes 63 include an outer diameter portion 64 having hooks 65 that support the array of vanes 63 with respect to a case structure. The vanes 68 may be secured to a structure, such as engine static structure 36, and remain stationary relative to the engine axis A. An airfoil 68 extends radially from the outer platform 64 to an inner diameter portion or platform 66. It should be understood that the disclosed vane arrangement could be used for vane structures cantilevered at the inner diameter portion of the airfoil. A root 74 of each blade 69 may be coupled to a rotor disk 72. The rotor disk 72 facilitates rotation of the blades 69 about the engine axis A.

Figure 3:
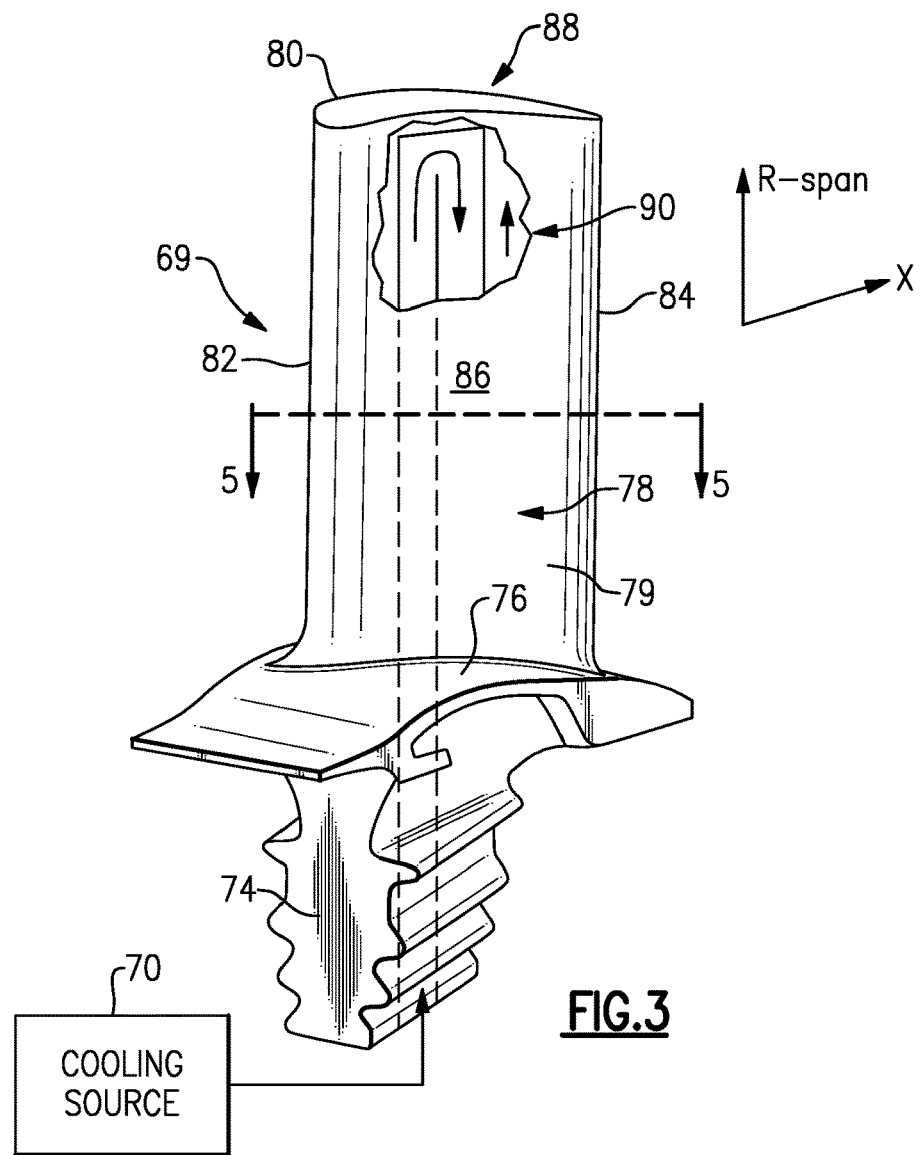
FIG. 3 illustrates a perspective view of an airfoil having an internal cooling passage.

Referring to FIG. 3, a root 74 of each blade 69 is mounted to a rotor disk. The blade 69 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform 76 is provided by the outer diameter of the rotor. The airfoil 78 provides leading and trailing edges 82, 84. The tip 80 is arranged adjacent to a blade outer air seal (not shown).

Figure 4:
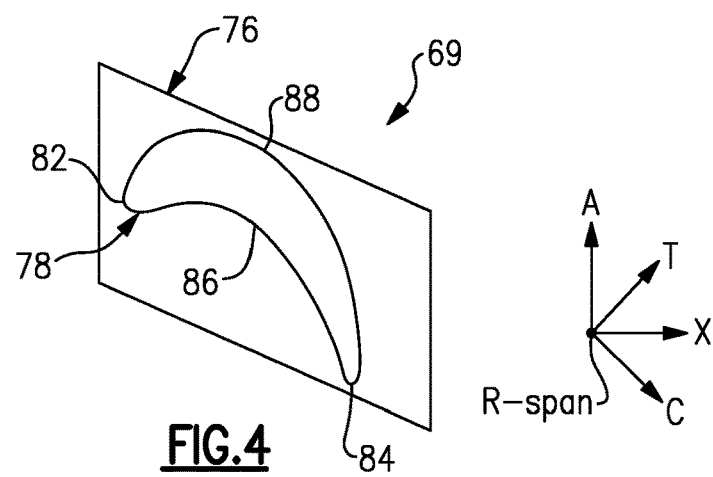
FIG. 4 illustrates a plan view of the airfoil illustrating directional references

The airfoil 78 of FIG. 4 somewhat schematically illustrates an exterior airfoil surface 79 extending in a chord-wise direction C from a leading edge 82 to a trailing edge 84. The airfoil 78 is provided between pressure (typically concave) and suction (typically convex) walls 86, 88 in an airfoil thickness direction T, which is generally perpendicular to the chord-wise direction C. Multiple turbine blades 69 are arranged circumferentially in a circumferential direction A. The airfoil 78 extends from the platform 76 in the radial direction R, or spanwise, to the tip 80.

In the example, the airfoil 78 includes a serpentine cooling passage 90 provided between the pressure and suction walls 86, 88. The serpentine cooling passage 90 provides a core cooling passage. The disclosed cooling passage arrangement may be used with other cooling passage configurations, including non-serpentine cooling passage arrangements. The cooling passage 90 receives cooling air from a cooling source 70 for internally cooling the airfoil 78. The cooling source 70 may be a source radially inward of the airfoil 78, in some examples.

Figure 5:
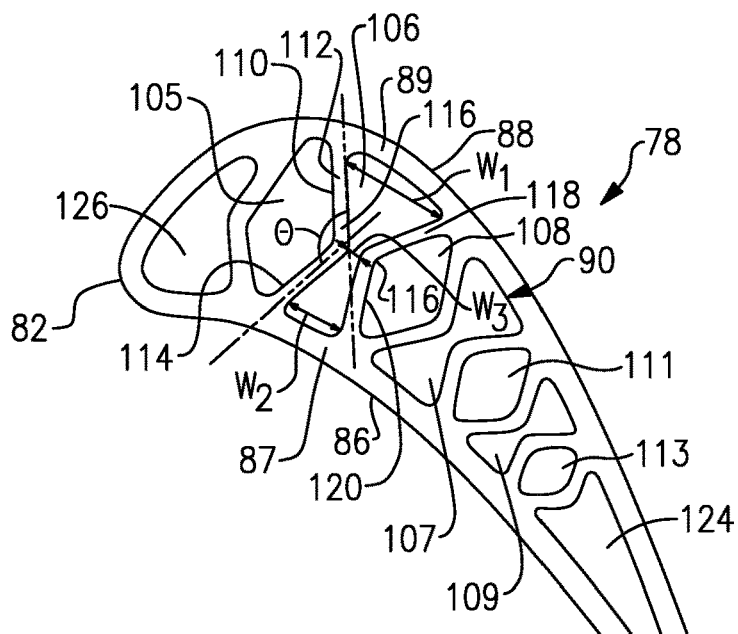
FIG. 5 illustrates a cross-sectional view of an airfoil taken along line 5-5 of FIG. 3.

FIG. 5 illustrates an example cross-section of the airfoil 78 taken along line 5-5 of FIG. 3. The cooling passage 90 may include passages having different shapes, such as passage 106. The cooling passage 106 is arranged between hot outer walls 87, 89 of the pressure side 86 and suction side 88, respectively. The cooling passage 106 has an "hourglass" shape. That is, the cooling passage 106 has a first width $W_1$ near the suction side 88, a second width $W_2$ near the pressure side 86, and a third width $W_3$ between the first and second widths. The third width $W_3$ is smaller than the first and second widths $W_1$, $W_2$. In some examples, the second width $W_2$ is smaller than the first width $W_1$. The widths $W_1$, $W_2$, $W_3$ are measured generally in the chordwise direction.

The third width $W_3$ generally divides the cooling passage 106 into a pressure side cavity and a suction side cavity. The first width $W_1$ is the widest point in the suction side cavity, while the second width $W_2$ is the widest point in the pressure side cavity. The third width $W_3$ provides a passage between the pressure and suction side cavities and can be sized to meter the flow between the pressure and suction side cavities. The third width $W_3$ may be at least about 0.002 inches (0.0508 mm), for example. In an example, the third width $W_3$ may be between about 0.002 and 0.100 inches (0.0508-2.540 mm). In a further example, the third width $W_3$ is about 0.030 inches (0.762 mm).

The widths $W_1$ and $W_2$ provide a large surface along the hot outer walls for cooling of the airfoil 78. The width $W_3$ is near a camber line of the airfoil. This gives the cooling passage 106 a smaller cross-sectional area, which may provide more efficient cooling.

The first and second widths $W_1$, $W_2$ are defined by a first internal wall 110 and a second internal wall 118. Each of the walls 110, 118 has a bend 116, which defines the third width $W_3$. The bend 116 divides each wall 110, 118 into a first portion 112 and a second portion 114 arranged at an angle θ relative to the first portion 112. The angle θ may be greater than 90°, for example. The angle θ for each wall 110, 118 may be the same or may be different. The walls 110, 118 are connected to the hot outer walls 87, 89, and are not connected to one another. The bend 116 permits the walls 110, 118 to flex and move with the outer walls 87, 89, when the outer walls 87, 89 expand axially. In other words, as the outer walls 87, 89 expand, the first width W1, second width W2, and third width W3 increase. The bend 116 allows the walls 110, 118 to flex so that each of the widths W1, W2, and W3 can increase a different amount. This may reduce stresses in the airfoil 78 as the outer walls expand.

The airfoil 78 may include multiple "hourglass" shaped passages, such as passages 107, 109. In this example, the airfoil 78 includes several kite or diamond shaped passages 105, 108, 111, 113 adjacent the hourglass passages. The diamond shaped passages 105, 108, 111, 113 are sandwiched between the hourglass passages 106, 107, 109. The diamond passages 105, 108, 111, 113 are isolated from the hot outer walls, and thus require less cooling air in those passages. In some examples, the diamond passages 105, 108, 111, 113 may transport cold air to other locations of the airfoil 78 or other components in the engine. In another example, the diamond passages 105, 108, 111, 113 are plenums with a small amount of cooling air.

Figure 6:
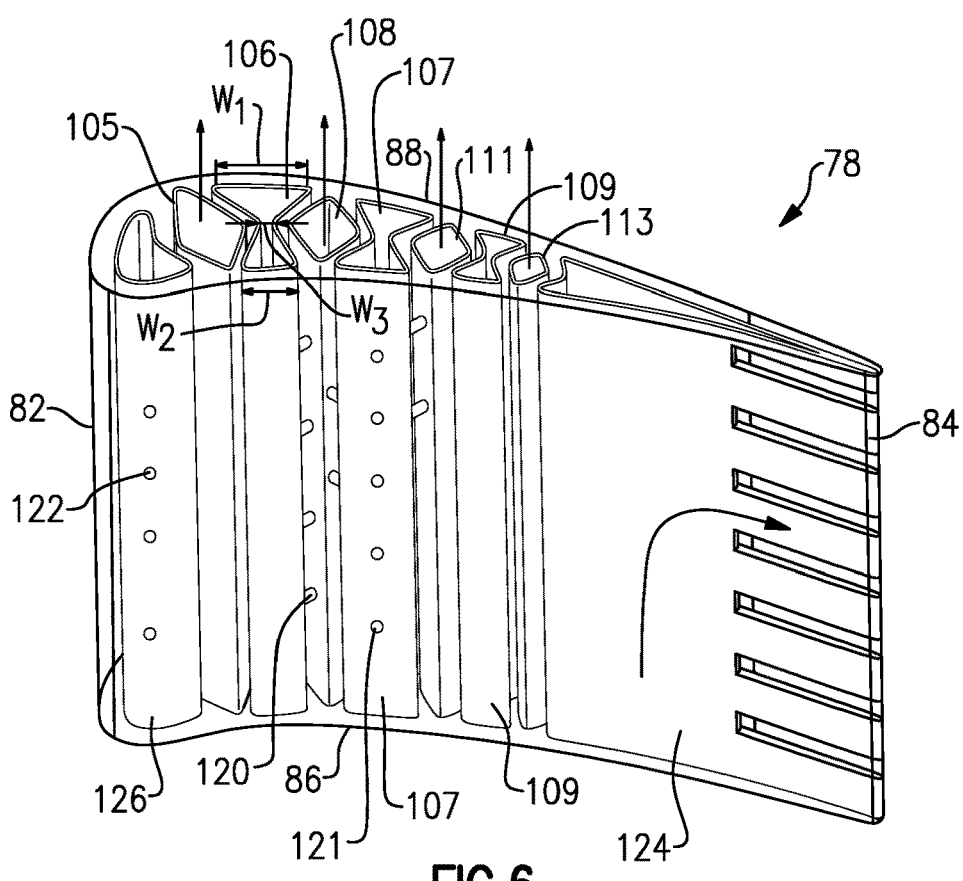
FIG. 6 illustrates a perspective view of an airfoil having an example internal cooling configuration.

FIG. 6 illustrates an example airfoil 78. A leading edge cooling passage 126 is arranged near the leading edge 82, while a trailing edge cooling passage 124 is arranged near the trailing edge 84. A plurality of hourglass shaped cooling passages and diamond shaped cooling passages are arranged between the leading and trailing edge cooling passages 122, 124. In the illustrated example, the airfoil 78 includes three hourglass shaped cooling passages 106, 107, 109, and four diamond shaped cooling passages 105, 108, 111, 113. In other examples, more or fewer cooling passages may be utilized.

In one example, the cooling passages 106, 107, 109 are arranged in a serpentine configuration. In this example, the cooling passage 106 is joined to the cooling passage 107 at a radially outer bend, and the cooling passage 107 is joined to the cooling passage 109 at a radially inner bend. The cooling passage 106 receives air from a cooling source 70 (shown in FIG. 3), the cooling air travels radially outward through the cooling passage 106, then radially inward through cooling passage 107, and radially outward through cooling passage 109. The diamond passages 105, 108, 111, 113 may all flow radially outward in this example.

In another example, the cooling passages 106, 107, 109 are arranged with a radial flow design. In this example, cooling air moves radially outward through each of the cooling passages 106, 107, 109. Cooling air may also move radially outward through cooling passages 126, 105, 108, 111, 113, and 124. The cooling air from the trailing edge cooling passage 124 may also flow axially out cooling edge slots. In another example, the cooling air moves radially inward through each of the cooling passages. This arrangement may be useful when the airfoil 78 is a vane, for example.

In some examples, the cooling passages may include trip strips, deptowarts, dimples, and/or pin fins on the internal surface of the hot walls 87, 89. The hot walls 87, 89 may have film cooling holes 121 for communicating cooling air to an exterior surface of the airfoil 78. The leading edge passage 126 may have film cooling holes 122 in communication with an exterior surface of the leading edge 82. In some embodiments, cooling apertures 120 connect adjacent cooling passages. The cooling apertures 120 may be holes, slots, gaps, or have another geometry. For example, cooling apertures 120 may connect a diamond shaped cooling passage, such as cooling passage 108 or 111, with an "hourglass" cooling passage, such as cooling passage 106 or 107. These cooling apertures 120 may provide impingement cooling in the cooling passages.

Figure 7:
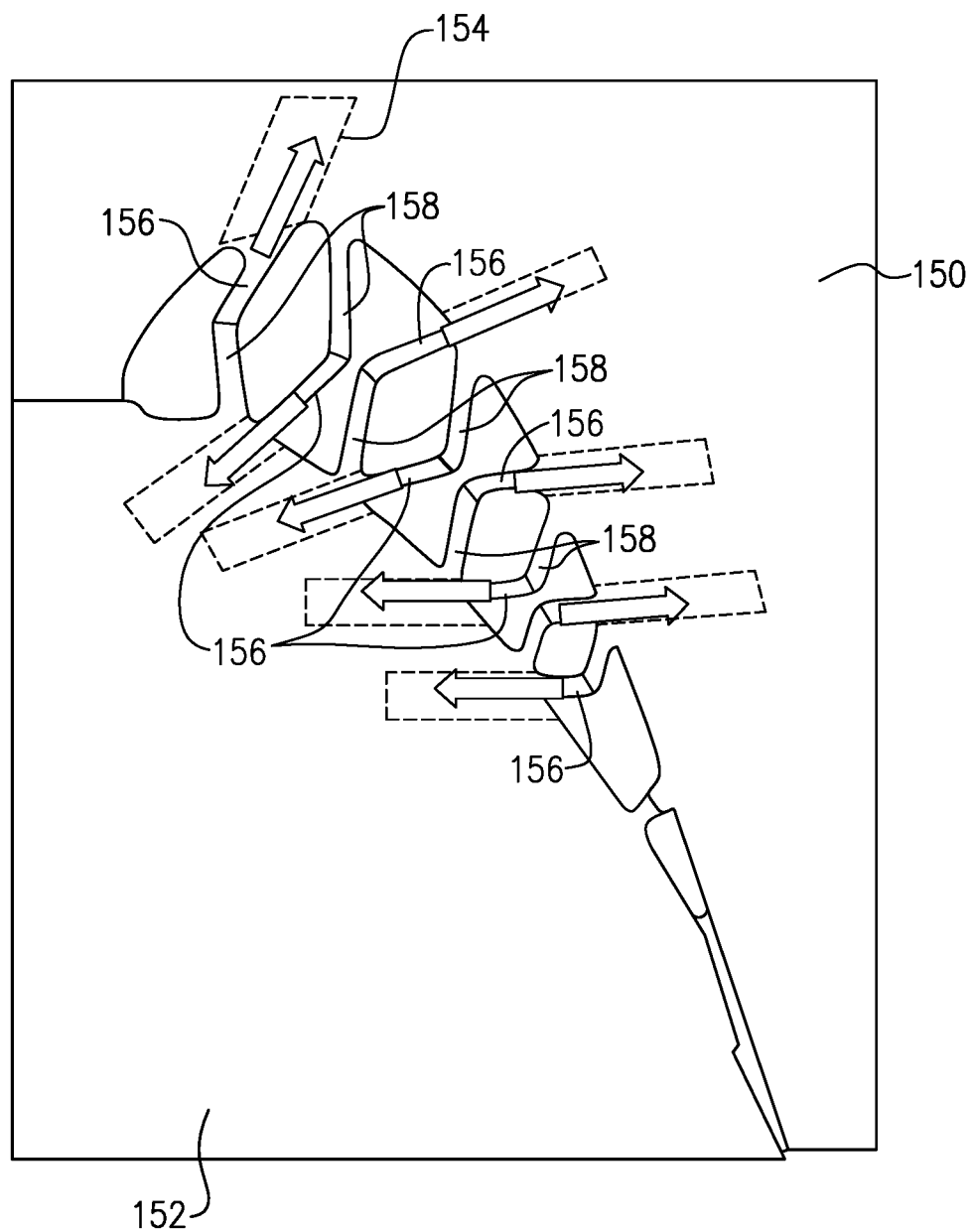
FIG. 7 illustrates an example method step of manufacturing an airfoil core.

The disclosed airfoil 78 may be cast or additively manufactured. FIG. 7 illustrates an example method step of manufacturing a core for casting the example airfoil 78. In this example, the airfoil core is cast in a core die having a first block 150 and a second block 152. Each of the first and second blocks 150, 152 has a plurality of pockets 154. The internal walls of the airfoil, such as bent walls 110, 118 are formed using ribs 156, 158. Ribs 158 are aligned with the separation direction of blocks 150 and 152, whereas ribs 156 are not. After the airfoil core is cast in the dies about the ribs 156, 158, to prevent ribs 156 from being trapped by the core during block separation, the ribs 156 are slid outward relative to the airfoil core in the direction of ribs 156 and into the pockets 154. The first and second blocks 150, 152 may be separated in a direction aligned with ribs 158 to release the airfoil core. The first and second blocks 150, 152 may be a metallic material, for example. The core may be formed by injecting a ceramic material into the core die, for example. The core may then be used to cast an airfoil.

In another example, the airfoil core may be manufactured using sacrificial inserts. In this example, a sacrificial insert is placed in the core die to form the walls 110, 118. The sacrificial insert may be a thermoplastic piece, for example. After the die is injected with material, the sacrificial insert is melted out, leaving a core having the above described internal features. The core may be used in a wax die to manufacture the airfoil, for example. In some examples, the die is injected with a ceramic material. After the core die is removed, the ceramic is fired to melt the sacrificial insert. The core may then be used to cast an airfoil.

In another example, the airfoil may be additively manufactured. The airfoil may be formed by sintering a metal powder one layer at a time to form the airfoil and internal walls. In one example, the airfoil is additively manufactured starting at the inner diameter portion and moving toward the outer diameter, relative to the engine axis A.

Known airfoil cooling arrangements have inner walls that are cold and stiff, and outer walls that are hot, causing higher thermal stress in the component. The disclosed cooling passage arrangement may reduce the required cooling flow to the airfoil by reducing the cross-sectional areas of the cooling cavities near the airfoil walls without increasing thermal stresses. The pressure side and suction side cavities are formed by bent walls that are not attached to one another, forming a passage between the pressure and suction side cavities. That is, the walls are separate from one another. This arrangement allows the ribs to move freely with the hot expanding outer walls, reducing thermal stress.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although the different examples have specific components shown in the illustrations, embodiments of this invention are not limited to those particular combinations. It is possible to use some of the components or features from one of the examples in combination with features or components from another one of the examples.

Although an embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. A core structure for a providing a cooling passage in a gas turbine engine component, comprising:
a core body having a first, second, and third cooling passage core, the first cooling passage core having first width in a chord-wise direction near a first wall, a second width in the chord-wise direction near a second wall, and a third width in the chord-wise direction between the first and second walls, the third width being smaller than the first and second widths to form an hourglass shape, the first cooling passage core arranged between the second and third cooling passage cores, and the second and third cooling passage cores having a kite shape, wherein a perimeter of the second and third cooling passage cores include an opposed pair of acute angles and an opposed pair of obtuse angles.

2. The core structure of claim 1, wherein the first, second, and third widths are formed from a die having a rib and a pocket that receives the rib.

3. The core structure of claim 1, wherein:
the third width of the first cooling passage core is established adjacent to a junction between faces of the second cooling passage core that establish one of the obtuse angle of the kite shape.

4. The core structure of claim 3, wherein a space between the first and second cooling passage cores has a bent portion associated with the obtuse angle.

5. The core structure of claim 1, wherein:
the first cooling passage core and the second cooling passage core are dimensioned to establish a common wall; and
the first cooling passage core and the third cooling passage core are dimensioned to establish another common wall.

6. The core structure of claim 5, wherein the first, second, and third cooling passage cores are connected to one another.

7. The core structure of claim 6, wherein the core body includes a first set of crossover connections that interconnect the first and second cooling passage cores, the core body includes a second set of crossover connections that interconnect the first and third cooling passage cores, the first set of crossover connections are distributed in a radial direction, the second set of crossover connections are distributed in the radial direction, and the first and second sets of crossover connections are dimensioned to establish crossover cooling passages.

8. The core structure of claim 5, wherein:
the first, second and third cooling passage cores are elongated in a radial direction and are distributed in a chordwise direction.

9. The core structure of claim 1, wherein a space between the first and second cooling passage cores has a bent portion.

10. The core structure of claim 9, wherein the bent portion has an angle that is greater than 90°.

11. The core structure of claim 9, wherein the space has a substantially constant thickness.

12. The core structure of claim 1, wherein the core body has a third cooling passage core, the first and third cooling passage cores arranged on either side of the second cooling passage core, the third cooling passage core having an hourglass shape.

13. The core structure of claim 12, wherein the first, second, and third cooling passage cores are connected to one another.

14. The core structure of claim 12, wherein the first, second, and third cooling passages are connected in a serpentine configuration.

15. The core structure of claim 12, wherein the core body has a fourth cooling passage core having a kite shape arranged adjacent the third cooling passage core and a fifth cooling passage core having an hourglass shape is arranged adjacent the fourth cooling passage core.

16. The core structure of claim 1, wherein the third width is between 0.002 and 0.100 inches (0.0508-2.540 mm).

17. The core structure of claim 1, wherein the core body is formed from a ceramic material.

18. The core structure of claim 1, wherein the gas turbine engine component is an airfoil.

* * * * *